Patented Nov. 22, 1938

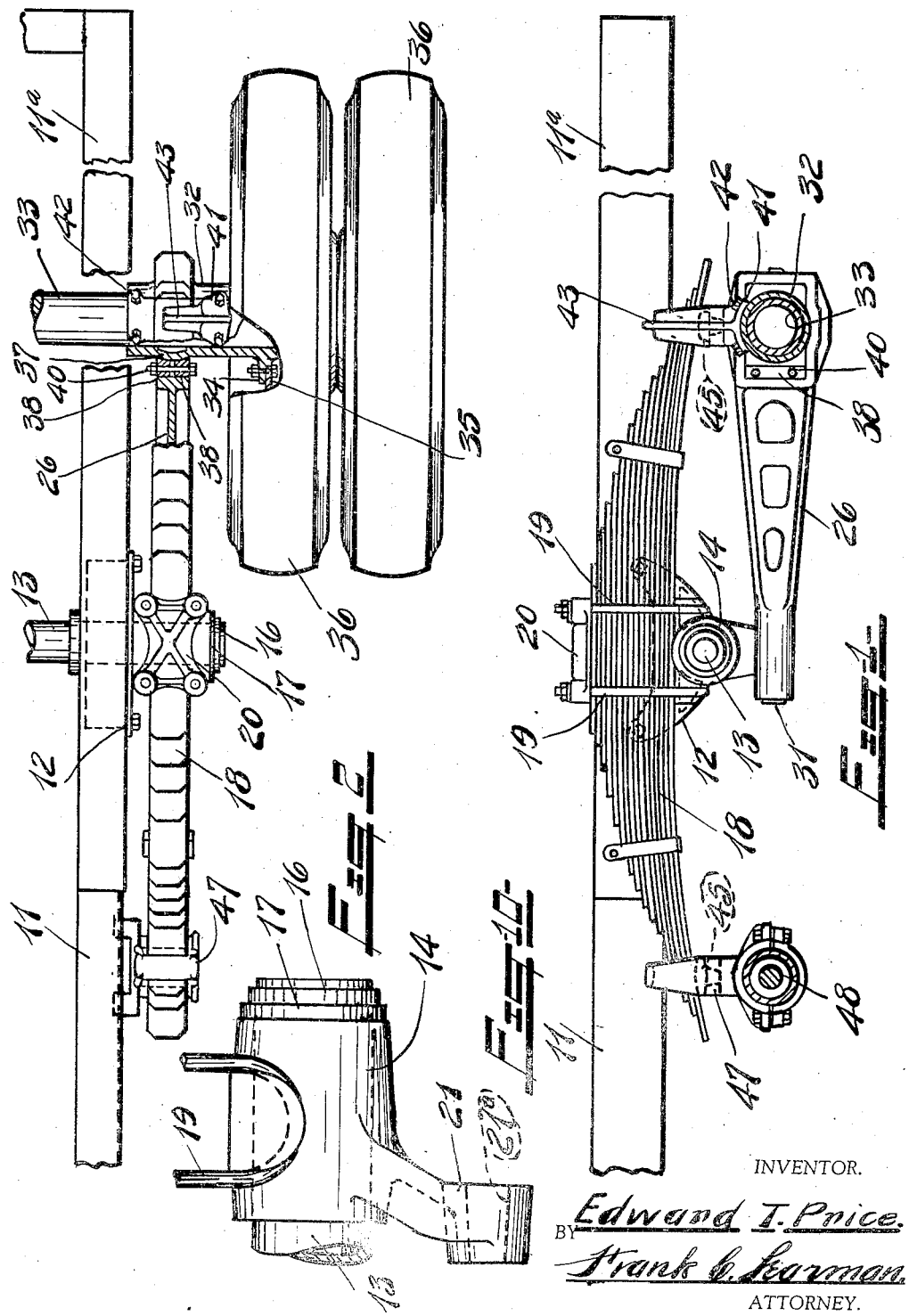

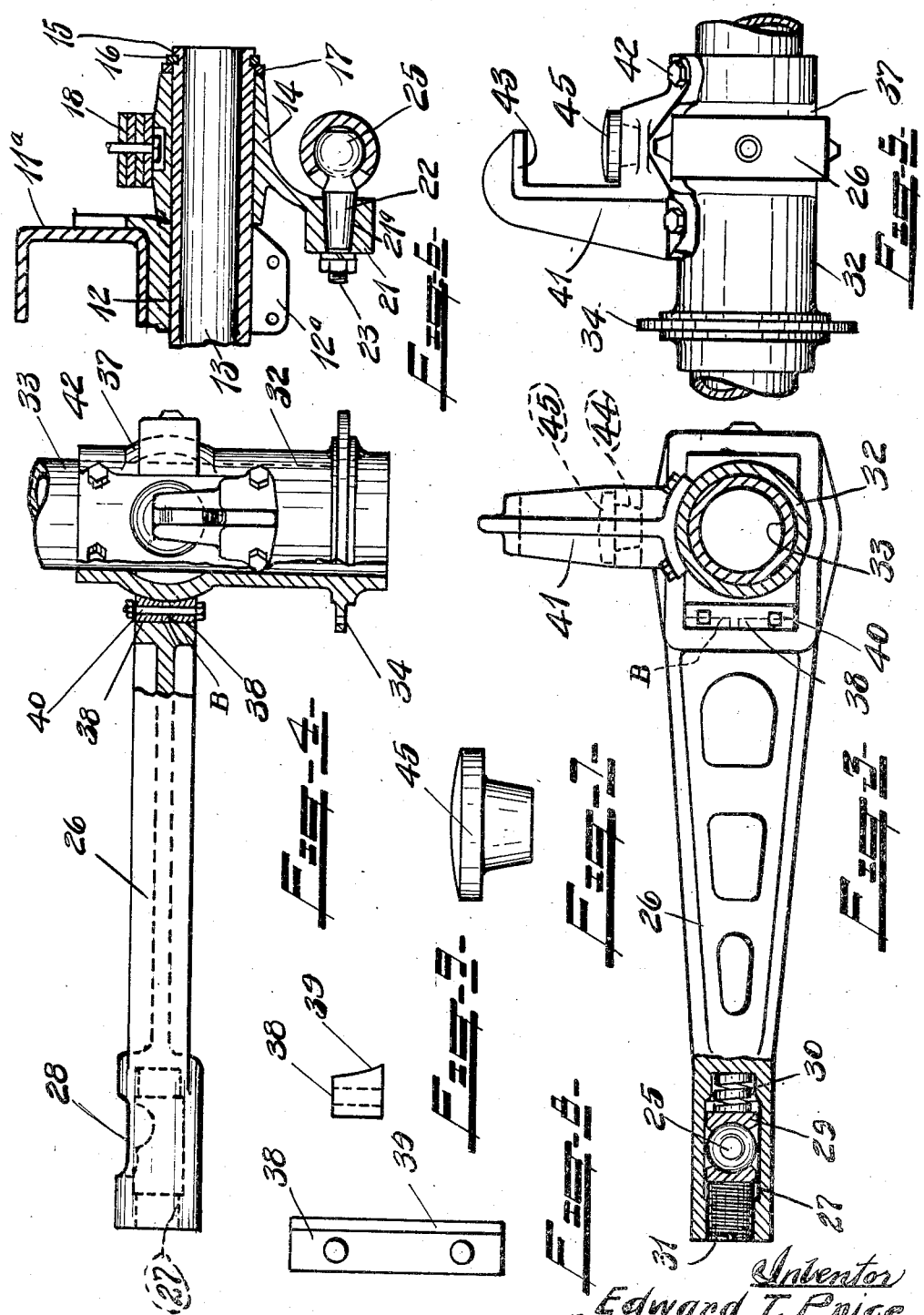

2,137,699

UNITED STATES PATENT OFFICE 2,137,699

WHEELED ATTACHMENT FOR MOTOR VEHICLES

Edward T. Price, Cadillac, Mich., assignor to Cadillac Malleable Iron Company, Cadillac, Mich., a corporation of Michigan Application October 10, 1934, Serial No. 747,676

1 Claim. (Cl. 280—124)

This invention relates to motor vehicle attachments and more particularly to an attachment including an auxiliary axle and wheel assembly attached in tandem with the driving axle of a conventional vehicle, and so attached that it is free to follow any motion of the vehicle without imposing tortional twists or strains on the vehicle frame and chassis, and without tire slippage.

One of the prime objects of the invention is to provide an attachment whereby the conventional four-wheel truck may be converted into a practical, efficient and rugged six-wheel truck, thereby materially increasing the pay load capacity of the vehicle without overloading the axles, reducing the haulage cost per ton mile, providing for additional loading space if required, and increasing the life of the tires and other equipment.

Another object is to design an adjustable flexible wheeled attachment which is connected to the frame in such manner that all wheels may rest on different levels caused by uneven road beds or obstacles, without causing binding, twisting, or breakage of the various parts.

Another important object is to design a tandem attachment which is so constructed and connected that there is no transfer of load from one axle to another as the wheels assume different levels, thereby insuring each axle carrying the same proportion of the total load regardless of wheel level.

A further object is to design a simple and rugged attachment for conventional trucks, which can be easily assembled, and which can be attached with a minimum of time and labor, and by unskilled labor.

A still further object is to provide a wheeled attachment so designed and constructed that downward pressure is applied to the driving axle in direct proportion to the force required to pull the attachment, thereby insuring maximum traction for the driving axle wheels for propelling the truck.

A further object still is to design an attachment so constructed and attached that the tandem axle functions only as a load carrying member, with all torque reactions independently absorbed by novel radius rods.

With the above and other objects in view, the present invention consists of the combination and arrangement of parts, hereinafter more fully described, illustrated in the accompanying drawings, and particularly pointed out in the appended claim, it being understood that changes may be made in the form, size, proportion, and minor details of construction, without departing from the spirit, or sacrificing any of the advantages of the invention.

In the drawings—

Fig. 1 is a fragmentary part sectional side elevation showing the adjustable radius rod, spring perch, and other cooperating parts.

Fig. 2 is a fragmentary top plan view, parts being broken away to show the construction.

Fig. 3 is an enlarged part sectional detail of the radius rod, spring perch, and axle.

Fig. 4 is a top plan view of the mechanism shown in Fig. 3.

Fig. 5 is a rear view.

Fig. 6 is an enlarged sectional detail showing the spring chair bracket and connections.

Fig. 7 is an enlarged detail of the spring perch wear pad.

Fig. 8 is a side view of one of the radius rod bearing blocks.

Fig. 9 is a plan view thereof.

Fig. 10 is an enlarged detail of the spring chair.

The tandem axle unit to which this application is directed may be added to the rear end of a standard motor truck, with practically no modification of the truck. It is merely necessary to mount the cross shaft on the frame, remount the springs, and add the proper spring perches and brackets to the conventional rear axle.

In the instant application the numeral 11 indicates a conventional motor truck frame which can be of sufficient length to permit attachment of the tandem axle, or an extension frame 11a may be secured to the rear end of the main frame in the usual manner if desired, and while in the accompanying drawings I have shown a fragmentary view of but one side of the vehicle, it will be understood that both sides are identical and are constructed in exactly the same manner.

Brackets 12 are secured to the vehicle frame in any suitable manner, and a transversely disposed shaft 13 is rigidly held therein by means of a suitable clamp 12a formed integral with the bracket, spring chairs 14 being journaled on the end sections of the shaft 13, said end sections being grooved as at 15 to accommodate spring rings 16, similar rings 17 being interposed between the rings 16 and the end of the spring chairs so that these chairs are held in freely revoluble position on the shaft.

Leaf springs 18 are mounted on the spring chairs 14 as usual, and U-bolts 19 extend through the pads 20 for securing the springs rigidly on the chairs in the conventional manner.

An extended boss 21 is cast integral with each spring chair and is formed with a tapered socket 21a in which the tapered end of the ball bolt 22 is mounted, the one end of said bolt being threaded as at 23 to receive the nut 24 as usual, the opposite end being formed with a ball 25 which is adjustably mounted in the radius rod 26 in a manner to be presently described.

The radius rods are formed as clearly shown in Figs. 3 and 4 of the drawings, the front end being cylindrical in shape and is internally bored as at 27, an opening 28 being provided in the side of the cylindrical section to accommodate and permit assembly of the ball 25 which is journaled in said bored end, bearing blocks 29 being provided on opposite sides of the ball, and a coil spring 30 is interposed between one of the blocks and the end of the bore 27, a screw plug 31 being threaded in the open end of the bore, and permits adjustment of the tension on the ball by manipulation of said plug.

The opposite end of the radius rod is formed with a rectangular shaped opening to accommodate an axle sleeve 32 in which a dead axle member 33 is mounted, a flange 34 being provided on each sleeve and to which the brake plate 35 is secured, the wheels 36 being journaled on the axle spindles in the conventional manner.

Each axle sleeve includes a tubular section 37, and the inner surface of the rear wall of the radius rod is shaped to conform to the curvature thereof, the front wall being formed with a centrally disposed lug B which serves to separate the radius rod bearing blocks 38 which are interposed between the sleeve and the front wall of the rectangular opening in the radius rod, the face 39 of each block being shaped to conform to the curvature of the sleeve, and bolts 40 serve to secure the blocks in assembled relation; and it will be obvious that adjustment can be made by grinding the closest parallel faces of the bearing blocks, thus permitting them to be drawn closer together and form a closer fit with the sleeve, or shims (not shown) can be placed between the bearing blocks and the wall of the radius rod, thus forcing the blocks into closer relationship with the sleeve.

A spring perch 41 is secured on each axle sleeve by means of studs 42, and is formed with a vertically disposed overhanging standard 43, the base being shaped to accommodate and permit free action of the radius rod. A cored opening 44 is also formed in the base of the perch, and a wear pad 45 is mounted therein, the head of the pad being rounded as shown, and the end of the spring 18 is adapted to rest thereon.

A substantially similar spring perch 47 is mounted on the rear drive axle 48, and the opposite end of the spring 18 is mounted thereon. As above described, the spring chairs are freely revoluble on the shaft 13, and it will be noted that the ends of the springs are loosely mounted in the perches and are not subjected to twist, thrust, or torque when the vehicle is traveling over rough, uneven roads, thus insuring full flexibility and easy riding qualities.

I wish to direct particular attention to the fact that the forward ends of the radius rods are connected to the spring chairs at a point below its center, and as the force required to pull the auxiliary axle is transmitted through the radius rods to the spring chairs, it will be obvious that said force will tend to rotate said chairs, and that this motion will be retarded by the springs, resulting in a downward thrust on the driving axle, and, consequently, maximum traction for the driving wheels.

Brakes (not shown) can be supplied for the added wheels, if desired. This, however, is immaterial and forms no part of the present invention.

From the foregoing description it will be evident that I have perfected a very simple, practical, efficient, and substantial attachment for motor vehicles.

What I claim is:

A motor vehicle including a frame, a drive axle beneath said frame, a dead axle beneath said frame, a sleeve surrounding said dead axle, a spring chair carried by the frame between the axles, said spring chair being in a plane above the plane of the axles, said chair having a sleeve, a transverse shaft on which said sleeve is rockably mounted, a spring carried by the chair above the sleeve and rockable therewith, the ends of said spring terminating above and spaced from the upper sides of the axles, a spring perch extending upwardly from the drive axle, a floating connection between said last named spring perch and one end of the spring above the axle, a downwardly extending arm carried by the under side of the chair sleeve, a radius rod having one of its ends hingedly connected to said downwardly extending arm and so constructed and arranged that the radius rod may move in a substantially vertical longitudinal plane and also have limited side movement, said radius rod extending radially towards the dead axle, the other end of said radius rod having a universal connection with said sleeve with limited side movement and on the axis of the dead axle, a spring perch carried by the sleeve of the dead axle and extending upwardly therefrom above the dead axle and a floating connection between said last named perch and the adjacent end of the spring.

EDWARD T. PRICE.